Jan. 8, 1952 — R. W. BROWN — 2,581,935
AIRCRAFT UNDERCARRIAGE
Filed Feb. 28, 1947 — 4 Sheets-Sheet 1
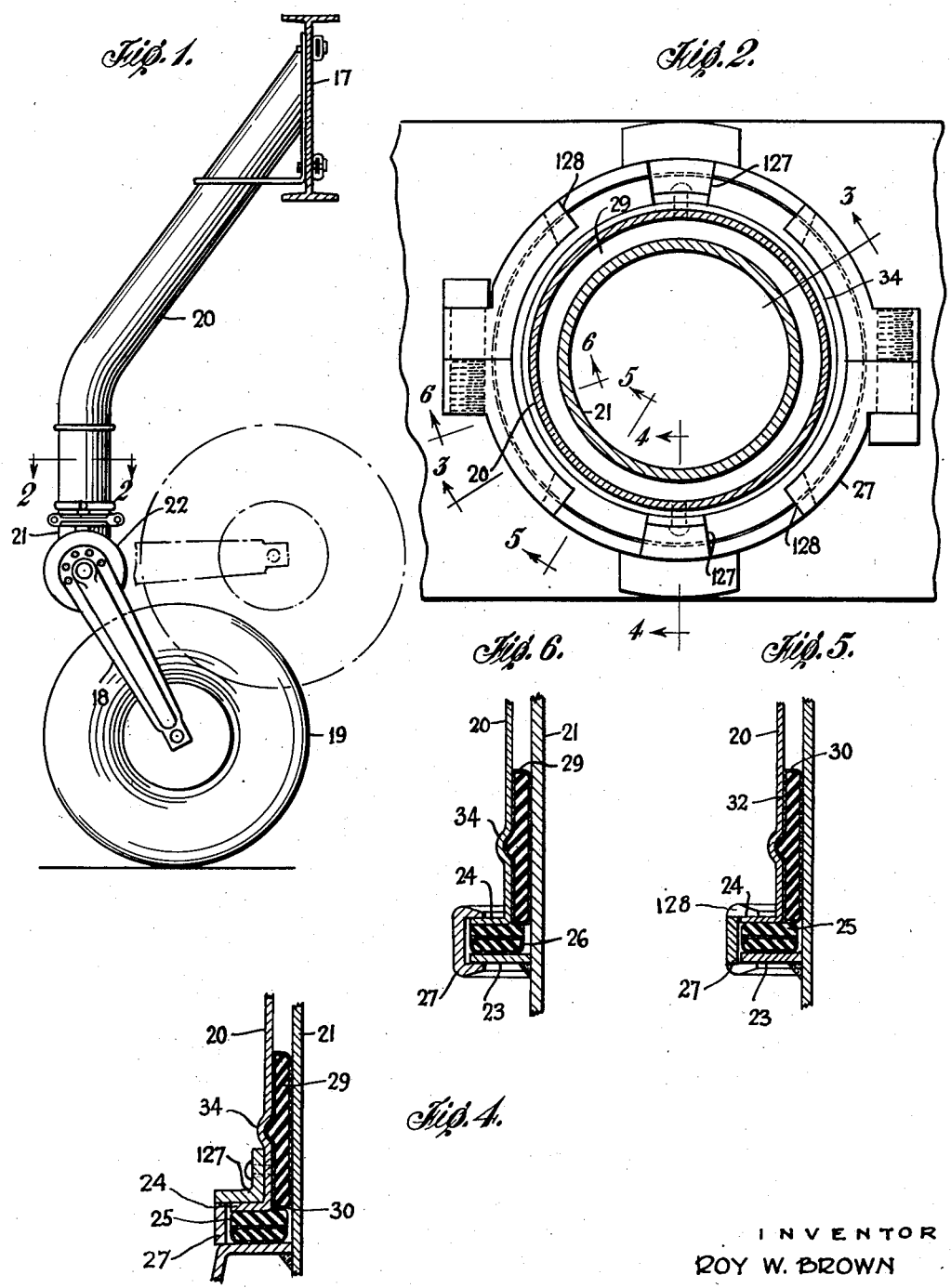
INVENTOR
ROY W. BROWN
BY Ely & Frye
ATTORNEYS

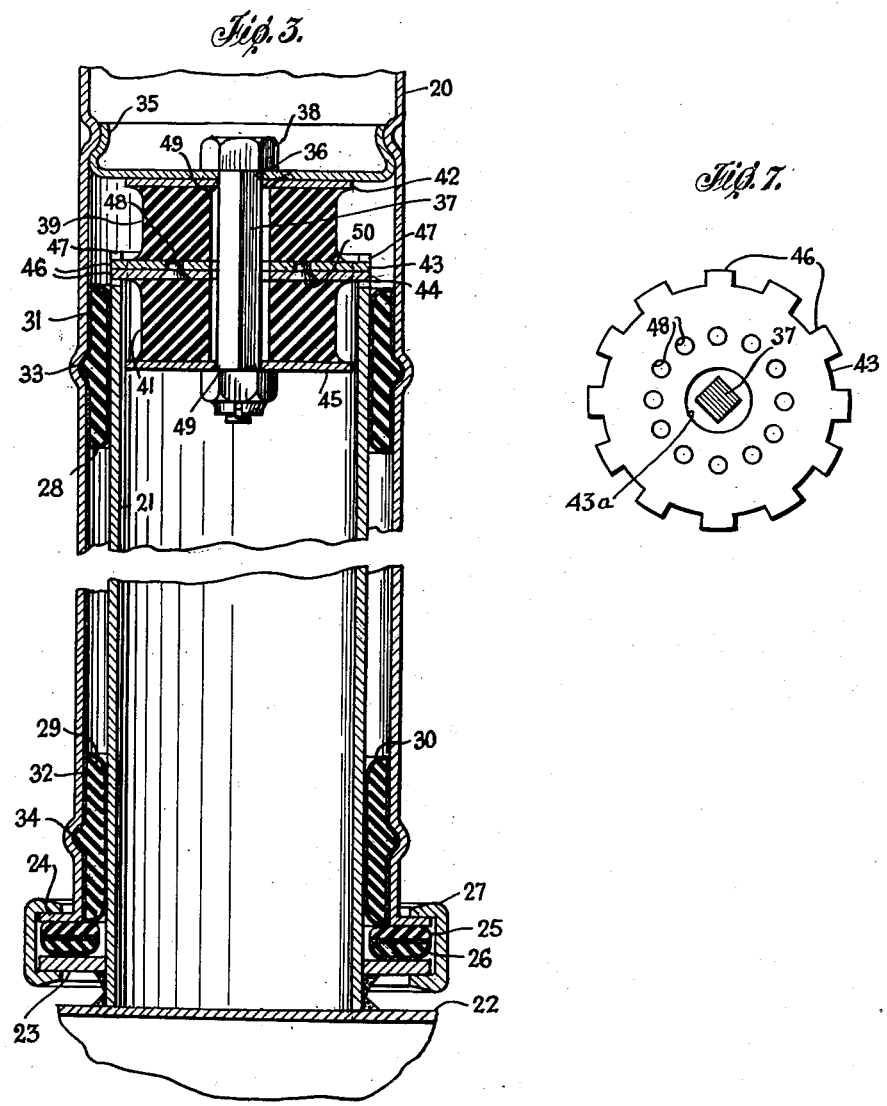

Jan. 8, 1952 R. W. BROWN 2,581,935
AIRCRAFT UNDERCARRIAGE
Filed Feb. 28, 1947 4 Sheets-Sheet 3
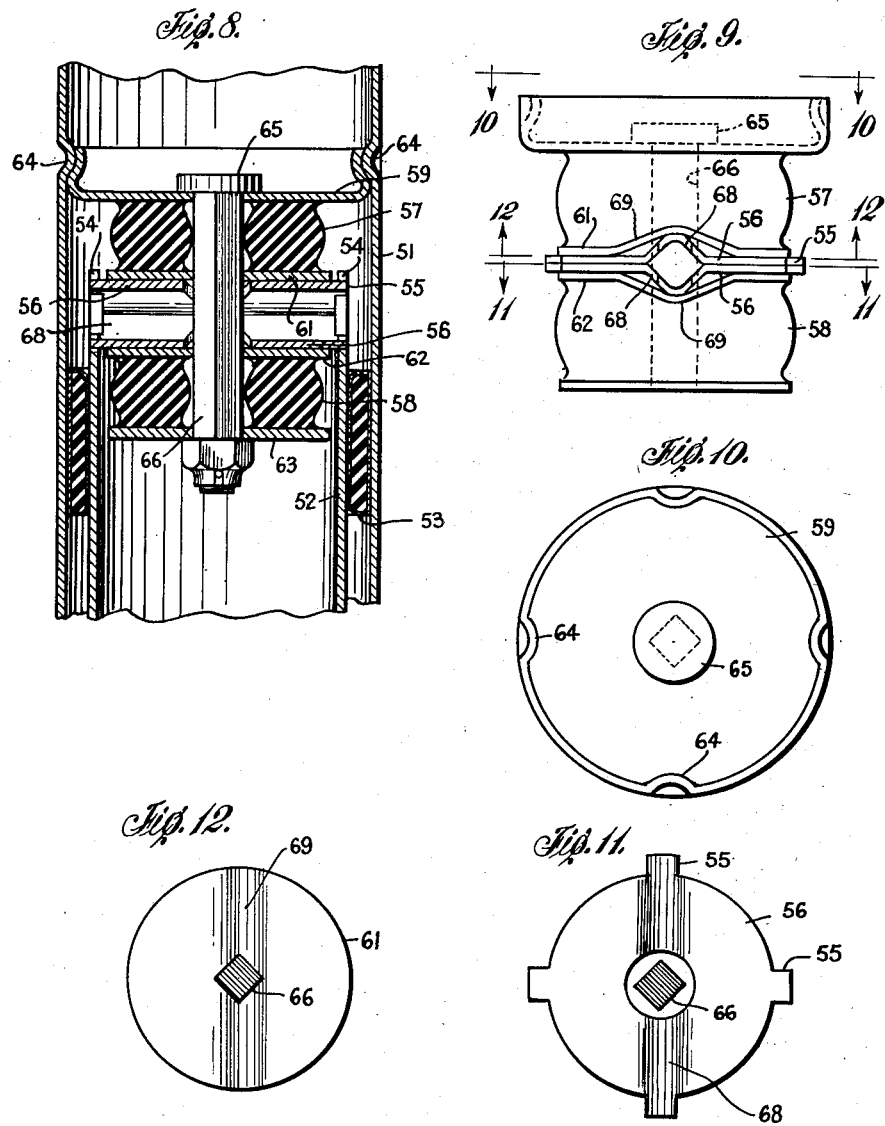
INVENTOR
ROY W. BROWN
BY Ely & Frye
ATTORNEYS Jan. 8, 1952     R. W. BROWN     2,581,935
AIRCRAFT UNDERCARRIAGE
Filed Feb. 28, 1947     4 Sheets-Sheet 4
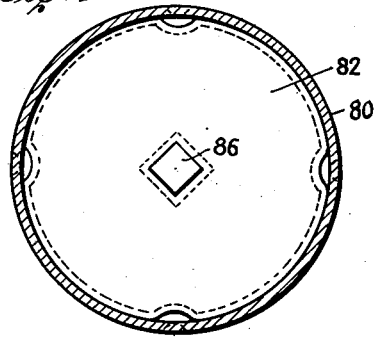
Fig. 14.
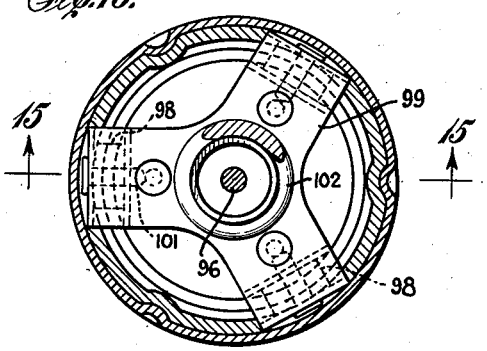
Fig. 16.
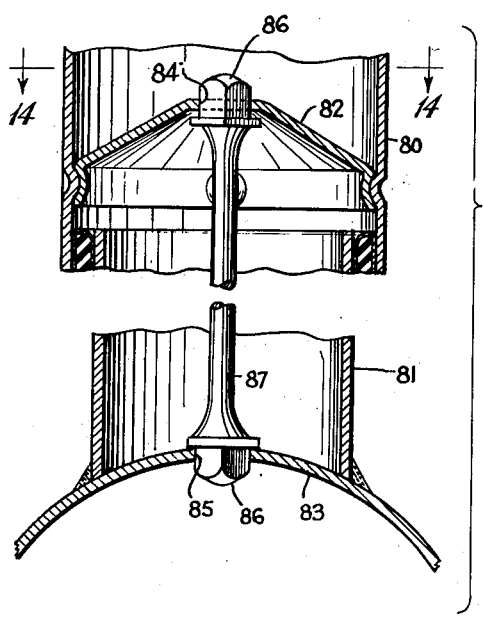
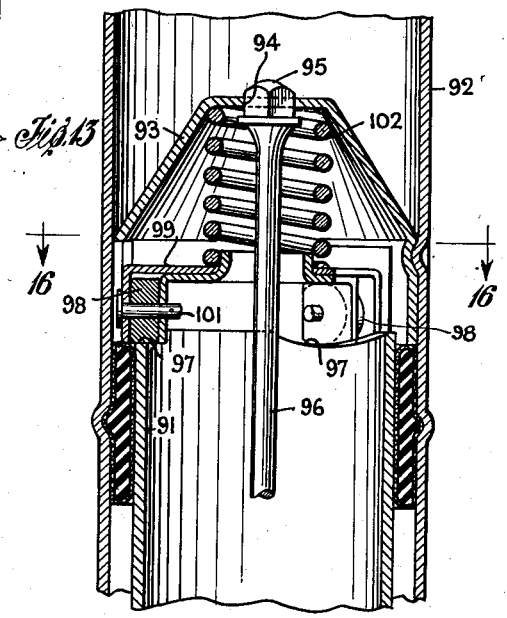
Fig. 15
INVENTOR
ROY W. BROWN
BY
ATTORNEYS Patented Jan. 8, 1952

2,581,935

UNITED STATES PATENT OFFICE 2,581,935

AIRCRAFT UNDERCARRIAGE

Roy W. Brown, Akron, Ohio, assignor to The Firestone Tire & Rubber Company, Akron, Ohio, a corporation of Ohio Application February 28, 1947, Serial No. 731,590

7 Claims. (Cl. 244—104)

This invention relates to aircraft undercarriage especially adapted for cross-wind landings.

One of the problems to be considered in the design and development of small, privately owned aircraft is the lack of adequate landing strips to permit safe landings under all wind conditions. It is quite desirable to have the aircraft adapted for cross wind landings so that only a minimum of landing strips and areas will be required to permit the aircraft to land regardless of the prevailing wind conditions.

While attempts have been made to provide aircraft with undercarriages that facilitate cross-wind landings, such equipment has been too heavy, or quite costly, or has been otherwise objectionable.

The general object of this invention is to avoid and overcome the foregoing and other disadvantages of previous types of aircraft undercarriages and to provide an aircraft undercarriage characterized by its ability to effect controlled swivelling of one or more of the landing wheels during cross-wind landings.

Still another object is to provide resilient torsional restraint of a swivelled landing wheel for aircraft.

Another object of the invention is to limit the amount of swivelling movement of a landing wheel relatively to the aircraft structure.

A further object of the invention is to provide an aircraft undercarriage which requires a minimum of maintenance and is adapted for long service life.

Another object of the invention is to provide an aircraft undercarriage comprising a landing wheel which may be torsionally deflected to guide the aircraft and which will return to a neutral position automatically when the torsional force thereon is removed.

Another object is to provide an improved rubber torsion member.

The foregoing and other objects of the invention will be made apparent as the specification proceeds.

Reference now is made to the accompanying drawings, wherein:

Fig. 1 is an elevation of an aircraft undercarriage embodying the invention;

Fig. 2 is an enlarged horizontal section on line 2—2 of Fig. 1;

Fig. 3 is an enlarged vertical section on line 3—3 of Fig. 2;

Figs. 4, 5 and 6 are fragmentary vertical sections taken on lines 4—4, 5—5 and 6—6, respectively, of Fig. 2;

Fig. 7 is a plan of a lock plate used in the embodiment of the invention shown in Figs. 1 through 6, showing a bolt, in section, engaged with the plate;

Fig. 8 is a section, substantially similar to Fig. 3, of a modified embodiment of the invention;

Fig. 9 is an elevation of the resilient connection device used in the invention embodiment of Fig. 8;

Fig. 10 is a plan of the device shown in Fig. 9 taken on line 10—10 thereof;

Figs. 11 and 12 are horizontal sections taken respectively on lines 11—11 and 12—12 of Fig. 9;

Fig. 13 is a fragmentary vertical section of a further modification of the invention;

Fig. 14 is a horizontal section taken on line 14—14 of Fig. 13;

Fig. 15 is a vertical section taken on line 15—15 of Fig. 16 of a further modified embodiment of the invention; and Fig. 16 is a horizontal section taken on line 16—16 of Fig. 15.

Now referring in detail to the structure shown in the drawings, a support member 20, usually tubular in form, is provided, which member is made from any suitable material and is adapted to engage in a conventional manner with a support plate 17 of an aircraft for support of same when not in the air. Member 20 is adapted to slidably receive cylindrical member 21, the lower end of which carries a torsion member 22 to provide pivotal mounting for a pair of fork arms between which a pneumatic tire and wheel assembly 19 is journalled.

Vertical load is transmitted between member 20 and cylinder 21 by means of a radially extending flange 23, suitably secured, as by welding, to cylinder 21. A flange 24 is usually formed on the lower end of the member 20 and a suitable annular thrust bearing 25 is positioned intermediate flange 23 and flange 24. Thrust bearing 25 may be of any suitable construction and, in this instance, is shown as comprising a rubber member having a friction material coating 26 on its lower surface, or extending through the body of the member 25, as shown, to divide the bearing, if desired. The friction material coating 26 has the unusual property of greater kinetic friction than static friction and it is made from fabric which is impregnated with castor oil, a wax compatible with the oil, and aluminum soap. Graphite also may be present in the impregnating composition, which is thixotropic. A conventional split clamp ring 27 is provided to engage with the outer surfaces of the flanges 23 and 24 to limit axial movement between members 20 and 21 while permitting rotation therebetween.

In order to retain the telescoped portions of the members 20 and 21 in concentric alignment, suitable bearings 28 and 29 are positioned within the cylindrical space therebetween. The bushings 28 and 29 are constrained against axial movement by metal backing plates 31 and 32, respectively, integrally bonded thereto, and expanded to form an annular rib at 33 and 34, respectively, said ribs being complementally engaged in suitable channels provided in member 20 by crimping. Ribs 33 and 34 may be replaced by a series of circumferentially spaced expanded areas, if desired. Friction material 30, similar to the friction material 26, may be integrally bonded to the radially inner surfaces of the bushings 28 and 29, as shown in Fig. 3.

An apertured support cup 35 is secured within member 20 immediately above the upper end of cylinder 21. Aperture 36 is of suitable shape to constrain a non-cylindrical bolt shank 37 against rotation therein.

Bolt 37 extends through plate 35 to provide clamping means for a pair of resilient disc-like torsion members 39 and 41, each such member being of sandwich construction with side plates 42, 43 and 44, 45 vulcanized or otherwise bonded to resilient disc-like elements, the two torsion elements being maintained clamped in juxtaposition, as best shown in Fig. 3. Plates 43 and 44 are centrally apertured at 43a to allow free clearance of bolt 37, and are provided with lugs 46 extending radially therefrom for engagement with slots 47 formed in the upper end of cylinder 21 to constrain the plates against rotational movement with relation to cylinder 21. Plates 43 and 44 are preferably provided with means for rendering them substantially integral, when in their assembled positions. Thus, pins 50, carried by plate 44, extend into registered apertures 48 in plate 43 to lock plates 43 and 44 in unitary assembly. Plates 42 and 45 are provided with rectangular apertures to complement the square shank of bolt 37, thus prohibiting rotation therebetween. Hence, the rubber torsion members 39 and 41 resiliently connect members 20 and 21 to permit slight rotational movement therebetween while resisting, resiliently, such movement initiated by torsional forces set up in the members 39 and 41. The engagement of cylinder 21 at the mid point of the torsional bearing assembly comprising discs 39 and 41 insures even distribution of torsional stresses throughout that assembly.

In order to limit the amount of relative arcuate movement of the pneumatic tire and wheel assembly 19, associated with cylinder 21, stop or motion limiting means may be provided. In Figs. 2, 4, 5 and 6 there is shown one embodiment of means for limiting rotational or castering movement of the undercarriage wheel disclosed herein. A stop lug 127, finding its support in member 20, is positioned immediately above flange 24 to depend therefrom, the lower margin thereof extending into a cut-out section 128 of clamp 27, as shown in Fig. 2. The split clamp 27 preferably has two such cut-out sections 128, diametrically opposed and each adapted to receive a stop lug. The remainder of the C-clamp 27 is continuous around each semi-circular portion of member 20 for retention of flanges 23 and 24 and bearing 25 in unitary assembly. Stop lugs 127 abut the end margins of cut-out sections 128 to limit wheel castering in each direction. Cut-out sections 128 are of preselected length to control the desired limit of castering. More than one set of cut-out sections may be provided in the same assembly to provide universal application of the undercarriage unit.

The construction described hereinabove provides a compact, sturdy, effective means for permitting wheel castering in aircraft undercarriage while simultaneously damping such castering to prevent wheel "shimmy" or yaw. Controlled castering enables the aircraft to be safely landed at greater angles to the prevailing wind than can be safely effected with previous undercarriages. Upon landing, initial ground contact of the wheels automatically aligns the wheels in the direction of forward motion of the airplane and this is true even though the airplane approaches the runway in a side-slip, due to the well-known characteristic of a caster to automatically align a wheel in the direction of vehicle movement, with the wheel axis "tailing" the vertical caster pintle.

The embodiment of the invention shown in Figs. 8 through 12 is very similar to that shown in Figs. 1 through 7, except that cam means are also provided to aid the undercarriage wheels in resisting and controlling the relative movement of the aircraft support members. In this instance, telescoped support tubes 51 and 52 have a bushing 53 positioned therebetween. The support tube 52 has a plurality of circumferentially spaced slots 54 formed in its upper end to engage lugs 55 formed on metal plates 56 to prevent relative rotation therebetween. To complete the assembly, resilient rings 57 and 58 are vulcanized to and extend between a metal cup 59 and a plate 61, and metal plates 62 and 63, respectively. The metal cup 59 is suitably secured to the member 51 to prevent relative movement therebetween and such securing means may comprise dimples 64 pressed into the member 51 from its outer surface. A bolt 65 having a square shaped shank 66 extends through the rubber rings 57 and 58 and their associated plates to axially clamp the resilient torsion rings to the cup 59 and thus to the member 51. The plates 61, 62 and 63, and the cup 59 have complemental apertures therein for receiving the shank of the bolt 65 to constrain the plates against rotation relatively of the bolt shank.

Fig. 9 shows that the plates 56 have cam surfaces 68 formed thereon in diametric opposition, whereas cam engaging or follower sections 69 are defined by portions of plates 61 and 62 at corresponding portions thereof whereby the cams 68 and cam followers 69 are normally engaged, to permit abutment of the planiform portions of paired plates 56 and plates 61 and 62. Thus, when a torsional force is applied to either the member 51 or 52 tending to rotate such member with relation to the associated support member, resultant movement of the cams 68 with relation to the cam followers 69 forces apart rings 57 and 58 to cause compression or flow of the material therein to the extent that they present increasing resistance to rotational movement between the tubes 51 and 52 due to wheel castering. Also, the rings 57 and 58, when deflected, will function to return the members 51 and 52 to their normal relative positions when the external force thereon is removed.

Still another embodiment of the invention, shown in Figs. 13 and 14, uses a minimum of parts and comprises an aircraft mounted cylinder 80 and a wheel carrying cylinder 81 in telescoped relation therewith. The cylinders 80 and 81 are, in general, secured together and associated for relative rotational movement and load transmittal as in the embodiments of the invention described hereinbefore. In this instance, a bridge member 82 is secured within the cylinder 80 and a support plate 83 is secured to the cylinder 81. The bridge member 82 and the plate 83 have non-circular apertures 84 and 85 formed therein complementally to receive ends 86 of a torsion bar 87 positioned by the bridge plate 82 and plate 83 and extending therebetween. Torsion bar 87, of suitable metal, is adapted to resist, resiliently, relative rotational movement between the members 80 and 81 and to realign such members upon removal of a distorting force.

A further modification of the invention embodying use of a torsion bar is shown in Figs. 15 and 16. In this embodiment, cylinder 91 extends into tubular member 92 and is mounted therein for slight arcuate movement with relation to the member 92 in any conventional manner. A bridge member 93 is positioned in and secured to the cylinder 92 and such bridge member 93 has an aperture 94 therein which engages with head 95 of a torsion member 96, the other end of which engages with a member (not shown) associated with the cylinder 91. The upper or inner end of the cylinder 91 has a plurality of cam surfaces or recesses 97 of any desired shape and spaced circumferentially. Cam surfaces 97 are adapted to engage with rollers 98, which are mounted on a yoke member 99, by pins 101. Fig. 15 best shows that the cam surfaces 97 are substantially symmetrically formed and have one maximum recessed or cut-out portion which gradually slopes up to the end of the cylinder 91. The rollers 98 normally are positioned at the bottom of the cam surfaces 97. To insure the requirement of substantial force for movement of the cams up to the cam surfaces 97 to the intervening flat, a relatively heavy coil spring 102 is compressibly retained between bridge member 93 and the yoke 99. Hence in this embodiment of the invention, relative rotational movement between the cylinder 91 and the tubular member 92 is resisted both by torsional forces set up in the torsion bar 96 and by the force required to compress spring 102 the axial depth of cam 97. In this instance, the cams and their associated means function as spring loaded detents that aid in centering the supported member 91 with relation to the support member 92 and in resiliently resisting relative rotational motion therebetween due to wheel castering. Energy stored in the spring 102 and torsion member 96 aids in returning the members 91 and 92 to their neutral positions, upon release of wheel torque.

In any of the embodiments of the invention disclosed herein, any conventional material may be used in forming the aircraft undercarriage, the resilient or rubber-like torsion bushings or cushions used in the invention, the torsion bars, etc. The illustrated embodiments are particularly adapted to light weight but sturdy constructions. The advantages above enumerated for landing operations are equally applicable to take-off operations, since the undercarriage described herein enables an aircraft to move on the ground with the longitudinal axis of the plane at an acute angle with the direction of ground motion. The carriage will function automatically as above stated to assume the proper wheel direction immediately upon ground contact during landing, regardless of whether the airplane is in straight flight or in a side slip, and the wheels will gradually return to normal or "centered" positions as the aircraft speed falls below the "stall" speed thereof.

In accordance with the patent statutes, one complete embodiment of the invention has been illustrated and described in detail but the invention is not limited to the specific examples set forth, since modification may be resorted to within the scope of the appended claims.

What is claimed is:

1. In an aircraft undercarriage, a tubular member fixed to the aircraft, a wheel carrying cylinder telescopically mounted in said tubular member, said tubular member and said cylinder each being provided at lower portions thereof with radially extending flanges, a resilient bearing disposed intermediate said flanges for power transmission therebetween in an axial direction, means associated with said flanges to limit axial movement in the opposite direction, said means comprising an annular C clamp adapted to be mounted around said flanges, a stop lug projecting radially from said tubular member, a cut-out section of said clamp into which the stop lug projects, and means disposed at the lower end of said cylinder for the pivotal mounting of an aircraft wheel.

2. In a torsion mounting adapted to be secured between two telescopically associated cylinders, a pair of axially aligned spool-shaped resilient elements disposed within said cylinders, radially extending plates bonded to the end surfaces of each of said elements, a second pair of plates intermediate the opposing plates of the axially aligned spools, said last-mentioned plates defining axially extending symmetrical cam lobe portions in diametric oppossition, said opposing end surfaces defining diametrically opposed cam follower surfaces adapted to allow abutment between the cam forming plates and the cam follower plates when in a single diametric position and to cause separation therebetween in all other diametric positions.

3. In an aircraft undercarriage having telescoped cylinders, a torsion bushing comprising a pair of superimposed plates with lugs extending from the peripheries thereof, a rubber-like member secured to each of said plates, a cover plate secured to each of the said members in substantially parallel relation to said lugged plates, and a bolt extending through said lugged plates and cover plates to provide clamping engagement therebetween and to clamp one of said cover plates to one of said cylinders; and means for securing said lugged plates to the second of said cylinders whereby said torsion bushing resiliently resists relative rotational movement between said cylinders.

4. In an aircraft support, two relatively rotatable cylinders positioned in telescoped relation, a pair of plates secured to one of said cylinders, said plates having cams formed thereon, a pair of resilient elements, metal plates secured to opposed surfaces of said elements, said resilient elements being disposed axially of said cylinders in juxtaposition with the innermost plates defining cam surfaces engaged with said cam, and means for securing the outermost metal plates to the other of said cylinders, whereby relative rotational movement of said cylinders is resisted by a compressive force set up in said resilient elements by cam action therebetween resulting in axial compression of said resilient elements.

5. In an aircraft undercarriage, a castor type landing wheel mounting assembly comprising a tubular member fixed to the aircraft to depend therefrom, said tubular member including a cylindrical lower end portion, a wheel carrying cylinder having one only of its ends telescopically mounted longitudinally slidable in an end portion only of the cylindrical portion of said tubular member, resilient torsion resistance means interposed between said tubular member and said cylinder, axially spaced cooperating radially extending flanges fixedly attached to said tubular member and cylinder respectively, a resilient thrust bearing disposed between said flanges, a clamp ring engaged with the radially outer edge portion of said flanges, said ring having a loose axial fit to said flanges thereby permitting a limited relative axial movement between said tubular member and cylinder.

6. In an aircraft undercarriage, a castor type landing wheel mounting assembly comprising a tubular member fixed to the aircraft to depend therefrom, said tubular member including a cylindrical lower end portion, a wheel carrying cylinder having one only of its ends telescopically mounted longitudinally slidable in an end portion only of the cylindrical portion of said tubular member, torsion resistance means interposed between said tubular member and said cylinder, axially spaced cooperating radially extending flanges fixedly attached to said tubular member and cylinder respectively, a resilient axial thrust bearing comprising rubber and fabric disposed between said flanges, a slidable clamp ring engaged with the radially outer edge portion of said flanges, said ring having a loose axial fit to said flanges thereby permitting a limited relative axial movement between said tubular member and cylinder.

7. In an aircraft undercarriage, a castor type landing wheel mounting assembly comprising a tubular member fixed to the aircraft to depend therefrom, said tubular member including a cylindrical lower end portion, a wheel carrying cylinder having one only of its ends telescopically mounted longitudinally slidable in an end portion only of the cylindrical portion of said tubular member, resilient torsion resistance means interposed between said tubular member and said cylinder, a pair of axially spaced resilient bushings disposed between the walls of said tubular member and cylinder whereby said walls are retained in spaced concentric relation, axially spaced cooperating radially extending flanges fixedly attached to said tubular member and cylinder respectively, a resilient axial thrust bearing comprising rubber with a fabric covering disposed between said flanges, a slidable clamp ring engaged with the radially outer edge portion of said flanges, said ring having a loose axial fit to said flanges thereby permitting a limited relative axial movement between the tubular member and cylinder.

ROY W. BROWN.

REFERENCES CITED

The following references are of record in the file of this patent:

UNITED STATES PATENTS

| Number | Name | Date |
|---|---|---|
| 395,147 | Jeffery | Dec. 25, 1888 |
| 807,968 | Seery | Dec. 19, 1905 |
| 1,845,345 | Sauzedde | Feb. 16, 1932 |
| 2,167,508 | Herold | July 25, 1939 |
| 2,394,825 | Trader | Feb. 12, 1946 |

FOREIGN PATENTS

| Number | Country | Date |
|---|---|---|
| 701,969 | France | Jan. 19, 1931 |
| 750,729 | France | May 29, 1933 |
| 789,814 | France | Aug. 26, 1935 |
| 691,789 | Germany | June 5, 1940 |